United States Patent Office 3,295,950
Patented Jan. 3, 1967

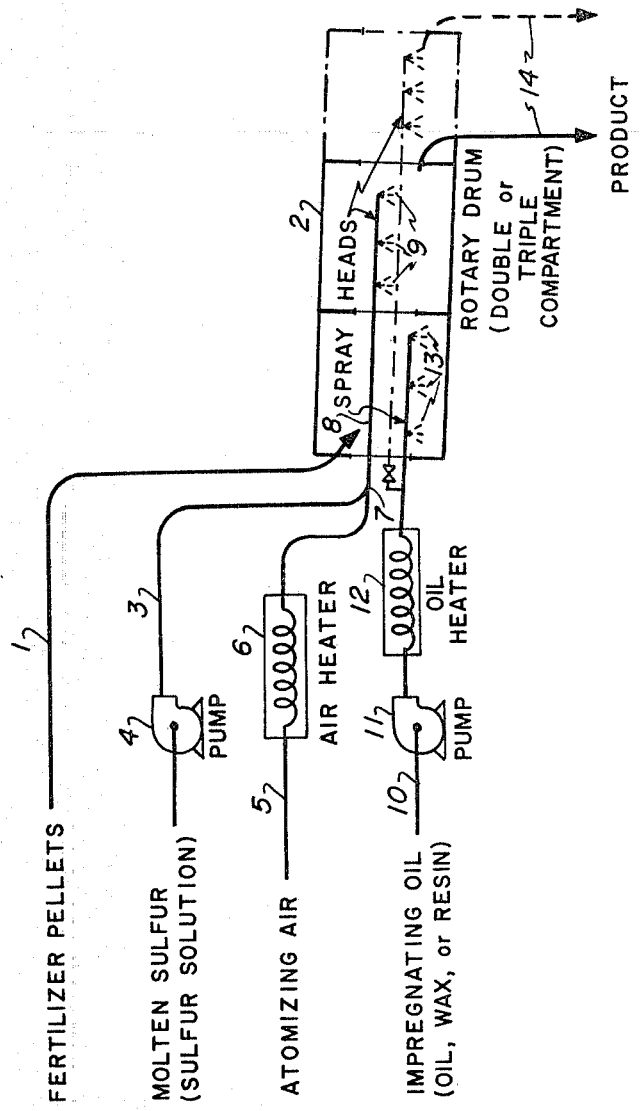

3,295,950
METHOD OF MAKING SULFUR-COATED FERTILIZER PELLET HAVING A CONTROLLED DISSOLUTION RATE
Glenn M. Blouin, Florence, and Donald W. Rindt, Sheffield, Ala., assignors to Tennessee Valley Authority, a corporation of the United States
Filed May 3, 1965, Ser. No. 452,947
7 Claims. (Cl. 71—64)

This application is a continuation-in-part of our application Serial No. 292,215, filed June 28, 1963, and now abandoned.

Our invention relates to an improved method to delay and control dissolution of soluble fertilizer materials when said materials are applied to the soil, and more particularly to a method for coating soluble fertilizer pellets so as to control the rate of dissolution in the soil as well as the products obtained by such method of treatment.

The earlier work described and claimed in our parent application (Serial No. 292,215, June 28, 1963, now abandoned) was principally concerned with the use of medium grade (viscosity) petroleum oils as a subcoating and/or topcoating for elemental sulfur coatings on fertilizer particles. This represented the best practice with which we were familiar at that time. We have, in the ensuing time, found that two petroleum byproducts, namely, petrolatums (crude and refined) and soft waxes, are even more effective than the petroleum oils. The present invention is directed toward specifically claiming these materials as sealant sub- and/or topcoatings. Also involved is a revision of the molten sulfur temperature range; 120° to 155° C. has now been determined to be the optimum sulfur temperature range.

Heretofore, the two principal approaches directed to controlling the rate of dissolution of soluble fertilizer salts and the like when applied to the soil have been either the production of a slowly soluble chemical compound, such as ureaform, or the method of coating fertilizer pellets with insoluble impervious shells. Such fertilizer materials having controlled rates of dissolution have numerous advantages over untreated water-soluble fertilizer compositions. Such treated fertilizer materials greatly reduce the leaching of the fertilizer by movement of the soil solution, minimize luxury consumption of the fertilizer by the plant, lower toxicity to seedlings or plants due to salt concentration, and decrease the loss of fertilizer values due to decomposition of same to the gaseous phase. On the other hand, when untreated water-soluble fertilizer materials are applied to the ground, much of their nutrient values may be carried away by the natural or artificial ground drainage and so wasted as far as useful contribution to the growth of the crop for which they are supplied. In fact, experiments have shown that as much as 80 percent of the fertilizer may be so wasted; therefore, smaller quantities of fertilizers having controlled dissolution rates can give the same effect as a larger quantity of hygroscopic, untreated fertilizer material, or the same quantity of fertilizer having a controlled dissolution rate can give a more prolonged effect throughout the growing season.

In the past, however, water-soluble fertilizer compositions treated for delayed dissolution or "waterproofing" had some outstanding disadvantages. Among these disadvantages is the fact that both types of commercial product, viz., the slowly soluble chemical compound and the waterproofed fertilizer salt pellets, have been found to be expensive and difficult to produce; and neither can be utilized in commercial farm crop applications because of the premium cost of the fertilizer. As used in this specification, the term "pellet" is used to include granules, prills, mixtures thereof, and other types of sized particles.

As heretofore carried out, the approach of coating fertilizer pellets with insoluble nearly impervious shells (hereinafter referred to as "waterproofing" for the sake of convenience) has generally been accomplished by applying the coating agent in a liquid condition to the individual particles of the hygroscopic fertilizer material. The results of such procedures, however, have not been found to be altogether satisfactory. Thus, it was frequently found in the case wherein the impervious shell comprised an oil or oil-like material that, if sufficient oil were employed to waterproof the material, the physical and chemical properties of the coated material were markedly and adversely affected. This is particularly noticeable in waterproofing water-soluble ingredients, such as urea and the like. Various other prior-art methods for bringing about a waterproofing effect for soluble fertilizer materials have included, for example, coating with lycopodium starch, other light powdery materials, and a waterproofing agent consisting of the metallic salts of high molecular weight fatty acids.

With reference to the above-mentioned approach of controlling the rate of dissolution of fertilizer materials by means of producing slowly soluble chemical compounds, a recent development along these lines is disclosed in U.S. Patent 3,024,098, Strand et al. Strand teaches that his fertilizer product is characterized by containing sufficient amounts of nutrients in a concentration nontoxic to the plants so as to release them slowly and gradually in the soil and make them available during at least the first full growing season of the plant. In accordance with his teachings, he produces a unitary fertilizer product by preparing a finely divided mass comprising essentially at least one nutrient constituent selected from the group consisting of certain types of urea formaldehyde compounds and phosphorus containing compounds. The mass is then compressed in a suitable apparatus into unitary products of predetermined substantially uniform size corresponding to the weight in the range from about 1 to 30 grams with a resulting fertilizer product containing sufficient amounts of nutrient in a highly concentrated but slowly soluble form.

Our invention is directed to an improved process for controlling and delaying dissolution of soluble fertilizers in the soil by means of coating such fertilizers with a nearly impervious shell, said shell comprising an inexpensive fertilizer raw material, elemental sulfur, along with a small amount of an inexpensive material selected from the group comprising petrolatums, petroleum softwaxes, petroleum oils, wood rosins, paraffins, and mixtures thereof. These materials are collectively or individually referred to as sealants hereafter. They are most conveniently applied in the fluid state, being melted if necessary. We have overcome the disadvantages inherent in the methods of coating or waterproofing hygroscopic fertilizer materials of the type shown in the prior art to a substantial extent in the present invention by means of our two-step or three-step coating procedure wherein a substantial part of the resulting nearly impervious shell is utilized in the dual role of supplying a secondary plant nutrient to the soil and acting as a controlling agent for the dissolution rate of the fertilizer particle substrate. The material comprising the shell in our invention costs less than one-tenth the cost of coating materials disclosed in the prior art.

Our process consists of a combination of two or three steps: first, the application of material selected from the group comprising petrolatums, petroleum softwaxes, petroleum oils, wood rosins, paraffins, and mixtures thereof, to the fertilizer pellets as an undercoating; second, the application of a sulfur coating to the treated pellets; and third, the application of an additional amount of the sealant material as a topcoating. In many cases, the first step may be omitted without serious effect. We have found that the petrolatum or other sealant, for example, may be applied by spraying or by soaking or dipping the pellets in the liquified sealant. If desirable, vacuum or pressure may be used in the soaking procedure to force more sealant into the void spaces of the individual pellets. In the second step, the sealant-treated pellets are coated with sulfur by spraying liquid molten sulfur or sulfur dissolved in liquid ammonia or other volatile solvent onto a rolling bed of pellets. In our process, the sulfur solidifies upon contact with the pellets and gradually builds a continuous shell around each pellet. We have found that it may be desirable to add small amounts (2 to 10 percent) of plasticizers, such as organic polysulfides, halides, or phosphorus polysulfides, to the molten sulfur to improve the quality of the resulting sulfur coating. In addition, small amounts (1 to 30 percent by weight of the mixture) of inert, finely divided solid materials such as powdered talc, and vermiculite or finely divided chemical compounds referred to as micronutrient compounds may be substituted for the above-mentioned plasticizers to realize even greater economies in our process. The micronutrient compounds are generally insoluble salts or frits of iron, zinc, copper, magnesium, manganese, molybdenum, boron, etc. Growing plants require these elements in very small quantities. The required quantities are so small that even distribution over the relative bulk of primary fertilizers presents a serious problem. Finely powdered micronutrients are necessary for this reason. However, this presents the problems of dusting off and segregation of the micronutrients. Inclusion in the sulfur coating shell solves both problems, i.e., even distribution and adherence. The sulfur coating may either be relatively light and unsealed and, therefore, specifically used to contain the micronutrients (Example V infra) or it may be heavier and sealed to realize slow-release characteristics (Example VI infra). These solid materials may be coarse but at least —100 mesh is preferable for ease of suspension in the molten sulfur prior to application.

We have also found that the use of larger than normal pellets (e.g. —4 +6 mesh v. —8 +16 mesh) is also beneficial in improving the effectiveness of a given proportion of coating. This is due to the fact that the larger particles have a greater ratio of weight to surface area so that a greater film thickness is obtained for a given proportion of coating.

We have found also that, in most instances, the third step is equally useful in promoting a nearly impervious shell on the fertilizer particles. In such instances, after the pellets have been treated with the sealant and subsequently coated with sulfur, a light topcoating of one of the sealants may be applied to the particles, thereby effecting a still more water-resistant shell about the particle substrate. However, often equally effective coatings may be produced when the first or sub-sealant coating is omitted. Furthermore, the several new and advantageous features over the conventional processes for preparing fertilizer pellets of controlled dissolution rates are realized by the present invention.

Among these advantageous features are: a simple and inexpensive process for waterproofing hygroscopic fertilizer pellets; a means for utilizing one of the cheapest fertilizer raw materials, elemental sulfur, in a dual role of supplying secondary plant-nutrient values to the soil, and contributing substantially the bulk of the material comprising the impervious shell.

It is therefore an object of the present invention to provide a process for the economical treatment of solid fertilizer substances of reduced particle size, such as granules, prills, and other types of sized particles, to make them resistant to dissolution in water, to reduce caking tendencies, to reduce or eliminate hydroscopicity, and to produce a fertilizer product having a controlled rate of dissolution when applied to the soil.

A further object of the present invention is to provide a process for the economical treatment of solid fertilizer substances of reduced particle size, such as granules, prills, and other types of sized particles, to make them water resistant, to reduce caking tendencies, to reduce or eliminate hydroscopicity, and to produce a fertilizer product having a controlled rate of dissolution when applied to the soil wherein the treating agent is utilized in the dual role of supplying secondary plant nutrients to the soil and acting as the pellet coating.

A further object of the present invention is to provide a means for evenly distributing micronutrient compounds without segregation.

A still further object of the present invention is to provide a means of treatment of substances, as aforesaid, by agents and methods which make no perceptible change in the treated material other than in the properties stated above.

Still further and more general objects and advantages of the present invention will appear from the more detailed description set forth below, it being understood, however, that this more detailed description is given by way of illustration and explanation only and not by way of limitation, since various changes therein may be made by those skilled in the art without departing from the spirit and scope of the present invention.

In carrying out the objects of our invention in one form thereof, we employ a process which comprises applying a material selected from the group comprising petrolatums, petroleum softwaxes, petroleum oils, wood rosins, paraffins, and mixtures thereof, as a subcoat to a fertilizer pellet substrate and subsequently supplying a topcoat of elemental sulfur by dipping the pellets or by spraying the pellets in a state of vigorous random motion with molten sulfur or sulfur dissolved in a solvent so that upon solidification of this sulfur, a mobile film of sealant under an insoluble shell of sulfur is formed on the surface of each pellet rendering the pellet much less susceptible to dissolution in the soil solution. To promote a still more nearly impervious coating, a third, or top, coating of the sealant material may be applied over the layer of elemental sulfur. As previously mentioned, this topcoating of sealant is often times sufficient, the subcoating of sealant, in such cases, being omitted.

Our invention, together with further objects and advantages thereof, will be better understood from a consideration of the following description taken in connection with the accompanying drawing which is a flow sheet generally illustrating the principles of our process which results in solid fertilizer pellets having the novel properties mentioned above.

Referring now more particularly to the flow sheet, fertilizer pellets from a source not shown are fed by means of line 1 into rotary drum 2. Line 1 may comprise a conveyor belt or similar delivery means. Molten sulfur from a source not shown is fed through line 3 by means of pump 4 into rotary drum 2. Atomizing air from a source not shown is fed through line 5 through heating means 6 and joins line 3 at junction 7. The molten sulfur and atomizing air junction at 7 and are fed by means of line 8 into rotary drum 2 by means of spray heads 9. Impregnating sealant material in a liquid state from a source not shown is fed through heated line 10 by means of pump 11, and is delivered into rotary drum 2 by means of spray heads 13. The product having desired controlled rate of dissolution leaves rotary drum 2 by means of line 14.

In the instance wherein both the molten sulfur and the sulfur solution coatings are to be applied in succession, they may be applied in the second and third compartments, respectively, of a triple-compartment drum 2. Rearrangement of the spray systems in the double-compartment drum would, of course, be necessary to permit addition of the molten sulfur before the sulfur solution. If a sulfur solution is used for coating, the atomizing air is not heated and is used only with low vapor pressure solvents. The addition of a third, or top, coating of the sealant could be accomplished in the third compartment of drum 2.

The method of application of the sealant coating material is not critical, although maximum penetration into the voids of the pellets is desirable. A simple method of application is that of spraying the liquefied sealant onto a rolling bed of pellets in a rotary drum. Dipping or soaking may be used as well. The oil or petroleum, for example, may be heated to improve penetration into the substrate voids. In contrast to the method of application, the type of sealant may be very important. Some heavy oils or waxes that solidify rather easily because of oxidation or freezing will not protect the substrate; boiled linseed oil and paraffin wax alone are examples. On the other hand, some waxy or resinous semisolid materials have been found to be quite effective. Both crude and refined petrolatums and certain grades of petroleum softwaxes are examples. In general, sealants that are effective remain somewhat fluid and mobile so that the microscopic openings in a normal sulfur coating are naturally filled with the sealant by capillary action, thus preventing moisture penetration. The sealant coating material must not be miscible with water. Preferably, it should have a high coefficient of viscosity so that it will penetrate to the void spaces in the pellets when hot but will become viscous at ambient temperatures. No reaction between the oil and sulfur should occur.

In the second step of the process, a uniform coating of elemental sulfur is applied to each pellet. Spraying molten sulfur onto a rolling bed of pellets in a rotary drum is the simplest and most satisfactory coating procedure. An air-atomizing spray is required to form sulfur droplets of sufficiently small size. A simple one-quart paint sprayer was used in the laboratory tests. Other methods of spray-coat application are spraying onto a falling curtain of pellets or into a fluidized bed of pellets. Any known method of providing randomized motion of the pellets with respect to each other during the spray-coating operation may be used.

Variables that have significant effects upon the sulfur-coating efficiency are molten sulfur temperature, temperature of atomizing air to the spray head, pellet temperature, pressure of air at sprayer, coarseness of sulfur spray, and distance of spray nozzle from moving bed of pellets. The temperature and coarseness of the sulfur spray at the time of contacting the particles appear to be the most important factors. The use of 2 to 10 percent by weight of one of the previously mentioned plasticizers or finely powdered inert solids or of 1 to 30 percent of one or more of the finely divided micronutrient compounds in the sulfur significantly improves the coatings, as compared with unplasticized sulfur, by improving the spreading and fusing of the individual droplets of sulfur and by reducing the degree of crack formation in the sulfur shell.

The application of the sulfur topcoat to each pellet also may be accomplished by spraying solutions of sulfur in volatile solvents such as liquid ammonia and carbon disulfide onto a moving bed of pellets previously lightly coated with a sealant in much the same manner as with the molten sulfur spray method. Sulfur solution concentrations of up to 30 percent sulfur may be used, although concentrations in the range of 5 to 15 percent result in more uniform coatings. In cases where heavily sealant-impregnated substrates are used, it may be desirable to improve the adherence of the sulfur coating by combining the molten sulfur spray and the sulfur solution spray methods. A light molten sulfur coating would be applied first in these cases. The solution spray method is more complicated but results in more effective coatings than the molten spray method.

The presence of the sealant-impregnated subcoating does not avoid the necessity for applying as nearly a uniform sulfur coating as possible. If the entire surface of the substrate is not covered completely with sulfur, the substrate will dissolve in water within a few minutes. It appears that the advantage given by the sealant subcoating is the sealing of the microscopic cracks and pores which form in the sulfur shell in spite of normal care in application. This permits the use of thinner, but necessarily uniform, coatings than is otherwise possible. Relatively large pores or thin spots due to nonuniform application are not sealed by the sealant.

In the process wherein the elemental sulfur is applied on the molten state, the sulfur, of course, prior to coating must be converted to a liquid form. This may be done by heating above its melting point (113° C.), preferably in the range of 120° to 155° C. to obtain optimum viscosity. The molten sulfur may be further treated by the addition of small amounts (1 to 10 percent) of ethylene polysulfides, thiodipropionic acid polyester, or phosphorus polysulfides in order to increase the plasticity and/or flowability of the molten sulfur. These additives alter the equilibrium crystalline structure of the sulfur upon solidification, rendering it less permeable to moisture and increasing the continuity of the sulfur coating deposited. Iodine (or other halogens) may likewise be added to the molten sulfur to decrease its viscosity; this is helpful in spreading the liquid sulfur over the granule surface in the very short time before it solidifies. Certain synthetic plastics such as polyethylene and polyvinyl acetate are compatible with molten sulfur and may be promising sealants for a normal crystalline coating. The addition of finely powdered inert solids, such as talc, vermiculite, or micronutrient compounds also aid in the uniform application of the sulfur and reduce its tendency to crack on cooling. The finely divided micronutrient compounds accomplish the same purpose and serve as micronutrient sources as well. These powdered solids are simply added in the desired quantity up to about 30 percent by weight to the molten sulfur prior to its application to the pellets. Only mild agitation is required to keep the solid micronutrient material in suspension.

In order that those skilled in the art may better understand how the present invention can be practiced, the following examples of processes which we have used in the steps of producing hygroscopic fertilizer pellets having an impervious shell or coating, thereby ensuring a fertilizer product having a controlled rate of dissolution in the soil solution, are given by way of illustration and not by way of limitation.

EXAMPLE I

Minus 8- plus 14-mesh urea prills were impregnated with SAE 30 motor oil by applying a vacuum to a suspension of the prills in oil. Excess oil was drained from the particles, leaving an oil residue of about 3 percent by weight. The oiled urea was coated with sulfur by means of a molten spray. The sulfur contained 5 percent plasticizer (ZM-421) from Thiokol Chemical Corporation).

Various proportions of coating were applied. The atomizing air to the sprayer was about 500° F. and 25 p.s.i.g. pressure. The tumbling bed of pellets was at 130° F. and the spray nozzle was 3 inches from the bed. The molten sulfur was at 177° C. For comparison, urea prills were also coated with oil only or with sulfur only (under same conditions as above). Similar tests in which large (—½ +⅜ in.) granules of ammonium phosphate nitrate were coated under the same conditions were also made. Again, oil or sulfur coatings alone were applied for comparison. The effectiveness of the coatings was determined by submerging the coated pellets in water and determining the proportion of the soluble salt dissolved after various lengths of time.

The oil treatment alone was entirely ineffective in all tests. The sulfur coatings alone reduced the rate of dissolution only slight. The combining of the oil and the sulfur coatings had a synergistic effect in that the combination gave far better results (lower dissolution losses) than did either coating when used alone. In two tests (35 percent sulfur coating on urea prills and 20 percent sulfur on the large granules), the dissolution losses were reduced to 30 percent and 0 percent, respectively, in 5 days of immersion.

EXAMPLE II

Additional tests were carried out as in Example I above and the results of these tests and the operating conditions under which they were carried out are given in Table I.

Table I

RATES OF DISSOLUTION IN WATER OF FERTILIZER PELLETS COATED WITH PETROLEUM OIL, WITH SULFUR [1], OR WITH THE COMBINATION OF AN OIL SUBCOAT AND A SULFUR TOPCOAT

| Fertilizer | | Weight percent of applied coating (total weight basis) | | | | Percent dissolution of fertilizer substrate in standard immersion test [2] | | | |
|---|---|---|---|---|---|---|---|---|---|
| Material | Particle size | Oil treated | Sulfur coated | Combination coating | | Oil treated | Sulfur coated | Combination coating | |
| | | | | Oil | Sulfur | 24 hr. | 24 hr. | 24 hr. | 5 da. |
| Urea prills | —8 +14 mesh | 3 | 25 | 3 | 25 | 100 | 70 | 15 | |
| | | 2 | 35 | 2 | 35 | 100 | 55 | 7 | 30 |
| Granules [3] | —1/2″ +3/8″ | 6 | 20 | 6 | 20 | 100 | 20 | 0 | 0 |
| | | 3 | 21 | 3 | 21 | 100 | 19 | 1 | |

[1] The sulfur contained 5% plasticizer, Thiokol ZM-421.
[2] Coated pellets immersed in water at room temperature for indicated time period; weight ratio of pellet to water, 1:5. Loss of substrate determined by drying at 150° F. and weighing.
[3] Ammonium phosphate nitrate (30-10-0).

EXAMPLE III

Still other tests were carried out as in Example I and the results of these tests and the operating conditions under which they were carried out are given in Table II.

Table II

EFFECT OF THE SEQUENCE OF ADDITION OF PETROLEUM OIL RELATIVE TO THE ADDITION OF SULFUR COATINGS ON FERTILIZER PELLETS UPON THE DISSOLUTION OF THE SUBSTRATE IN WATER

| Variables | —8 +14 M Urea Prills | | | —4 +6 M 30-10-0 Granules | | |
|---|---|---|---|---|---|---|
| | Undercoat | Topcoat | Undercoat and Topcoat | Undercoat | Topcoat | Undercoat and Topcoat |
| Sulfur Coating [1], Weight Percent | 22.2 | 22.6 | 22.2 | 20.4 | 20.6 | 20.6 |
| Oil Coating [2], Weight Percent: | | | | | | |
| Undercoat | 4.4 | None | 3.3 | 3.8 | None | 4.5 |
| Topcoat | None | 3.1 | 2.5 | None | 3.1 | 2.3 |
| Substrate Dissolution [3], Weight Percent | 42 | 53 | 11 | 31 | 7 | 27 |

[1] Sulfur applied as molten spray; contained 5% by weight of ZM-399 Thiokol plasticizer.
[2] SAE 30 oil; applied either before (as undercoat) the sulfur coating, after (as topcoating) the sulfur coating, or both before and after (as combination) the sulfur coating.
[3] Standard test, as described in Footnote (b), Table I.

EXAMPLE IV

Minus 8- plus 14-mesh urea prills and —4 +6-mesh ammonium phosphate-nitrate granules were coated with sulfur by spraying a uniform suspension of finely ground (100 percent minus 200 mesh) vermiculite or talc in the molten sulfur under essentially the conditions described in Example I. A final topcoating of petroleum oil was added in all tests. The results of these tests and the conditions under which they were made are given in Table III. Tests (Nos. 3 and 6) in which only plasticizer was added to the molten sulfur are given for comparison.

solubilized. Without such a coating, 100 percent of the substrate dissolved in less than 2 hours.

*Table III*

EFFECTS UPON WATER DISSOLUTION OF THE ADDITION OF FINELY POWDERED INERT SOLIDS TO THE MOLTEN SULFUR PRIOR TO THE APPLICATION OF SULFUR COATINGS AND OIL TOPCOATING [1] TO FERTILIZER PELLETS

| Test No. | Fertilizer | | Sulfur coating [2] Weight Percent | Additive | Additive Particle Size | Additive Weight Percent [3] | Dissolution of substrate in 24 hours Weight Percent |
|---|---|---|---|---|---|---|---|
| | Material | Particle Size | | | | | |
| 1 | Urea Prills | −8+14 M | 25 | Talc | −300 M | 5 | 5 |
| 2 | do | −8+14 M | 20 | Vermiculite | −350 M | 2 | 2 |
| 3 | do | −8+14 M | 20 | ZM-421 [4] | | 5 | 7 |
| 4 | Granules [5] | −4+6 M | 15 | Talc | −300 M | 5 | 6 |
| 5 | do [5] | −4+6 M | 11 | Vermiculite | −350 M | 2 | 1 |
| 6 | do [5] | −4+6 M | 15 | ZM-421 [4] | | | 4 |

[1] Prills had 6% SAE 30 oil topcoatings; granules had 4% SAE 30 oil topcoats.
[2] Including additive.
[3] Amount of additive in sulfur by weight percent.
[4] Tests with homogeneous sulfur-plasticizer (Thiokol organic polysulfide) coatings.
[5] TVA 30-10-0.

It is noted that both solid, inert additives were essentially equal in effectiveness to the organic polysulfide plasticizer in yielding low dissolution rates for these oil topcoated products. The vermiculite was generally more effective than either the talc or the plasticizer.

EXAMPLE V

Thirty parts of a pulverized commercial micronutrient frit (FTE 502—2.8 percent B, 2.0 percent Cu, 4.0 percent Zn, 9.7 percent Mn, 3.9 percent Fe, and 0.13 percent Mo) were suspended in 70 parts of molten elemental sulfur maintained at 250° F. The frit was sized to minus 20 mesh. Vigorous agitation of the suspension was provided to prevent settling. The suspension was sprayed through a commercial constant-bleed paint gun nozzle, using heated atomizing air (300° F.), onto a rolling bed of minus 4- plus 6-mesh 30–10–0 ammonium phosphate nitrate granules in a small rotary drum. The liquid suspension solidified into a uniform coating on each granule. The coating was 14 percent of product weight. The micronutrient element concentrations (wt. percent) in the product were: 0.12 B, 0.08 Cu, 0.16 Zn, 0.42 Mn, 0.16 Fe, and 0.05 Mo; the sulfur concentration was 9.8 percent by weight. The coating, not intended to greatly retard the substrate dissolution rate, served as an excellent anticaking medium as well as a source of the micronutrients.

EXAMPLE VI

Twelve parts of a finely divided (−100 mesh) mixture of ZnO, CuO, MnO$_2$, Fe$_2$O$_3$, MoO$_3$, and H$_2$B$_4$O$_7$ were suspended in 88 parts of molten elemental sulfur maintained at 280° to 300° F. The amounts of each of the compounds were so regulated as to yield the following product analysis when the sulfur micronutrient coating amounted to 20 percent by weight: 0.2 percent of each of boron, copper, zinc, and manganese; 0.45 percent of iron; and 0.01 percent of molybdenum. Mild agitation (periodic shaking) of the suspension was needed to prevent settling of the suspension. The suspension was applied to minus 4- plus 6-mesh ammonium phosphate nitrate granules in the manner described in Example I; the weight percent of this coating was 19 percent. An additional sealant coating of USP petrolatum was sprayed onto the sulfur coating in the amount of 3 percent by weight of the product; this step was after the manner described in patent application Serial No. 292,215, June 28, 1963, Blouin et al., assigned to the same assignee as is the present application. The final product contained about 0.19 percent each of B, Cu, Zn, and Mn, 0.40 percent Fe, and 0.009 percent Mo. When a 2-gram sample was submerged in 10 milliliters of water for 24 hours at room temperature, only 9 percent of the soluble substrate was

EXAMPLE VII

Minus 4- plus 6-mesh ammonium phosphate nitrate granules were coated with various combinations of petroleum oil (SAE 30) and sulfur, or of PRP (1 part petrolatum, 3 parts wood rosin, and 1 part paraffin, by weight) and sulfur to compare the effectiveness of the PRP mixture with petroleum oil as the secondary coating medium. The sulfur was applied under the general conditions as described in Example I. The conditions under which the tests were made and their results are given in Table IV below.

*Table IV*

COMPARISON OF EFFECTS OF PETROLEUM OIL SECONDARY COATINGS UPON SUBSTRATE DISSOLUTION IN WATER WITH THOSE OF PRP WHEN APPLIED TO SULFUR COATED AMMONIUM PHOSPHATE NITRATE GRANULES (−4+6 MESH)

| Test No. | Petroleum Oil Coatings | | | Total Coating | Dissolution of Substrate in Water in 24 hours Weight percent |
|---|---|---|---|---|---|
| | Weight Percent of coating | | | | |
| | Undercoating | Sulfur | Topcoating | | |
| 1 | 1 | 21 | 4 | 26 | 16 |
| 2 | None | 16 | 3 | 19 | 6 |
| 3 [1] | 2 | 15 | None | 17 | 29 |
| 4 [1] | 2 | 15 | 1 | 18 | 7 |
| 5 [1] | None | 16 | 5 | 21 | 16 |

[1] PRP Coatings.

The data indicate that the PRP was about as effective as the petroleum oil (Test 2 v. Test 4) but that the combination of undercoating and topcoating was required for the PRP. The product from Test 4, after aging for 3 months, was considerably more effective (dissolution rate, 0.2 percent in 24 hours) than when first applied.

EXAMPLE VIII

Minus 8- plus 14-mesh urea prills were coated with elemental sulfur by means of a molten spray. The molten sulfur was maintained at about 155° C. in the spray can. The atomizing air was held at 15 p.s.i.g. and 165° C. The urea prills were tumbled in a 6-inch diameter horizontal rotating drum at 60 r.p.m.; the average temperature of the prills during the coating process was 65° C. The spray nozzle was held 3 inches from the tumbling bed. Molten sulfur was sprayed on the bed until the sulfur content of the coated product was 27.9 percent by weight. Following this, USP petrolatum was melted at about 55° C. and sprinkled over the warm sulfur-coated prills. The sealant spread rapidly and evenly in about 5 minutes of tumbling. The sealant content of the product was 3 percent by weight. The coating was tested by submerging a sample of the coated product in water at 27° C. and 38° C. for 24 hours. After this time, drying the product revealed that only 2 percent by weight of prills was dissolved at 27° C. and 7 percent at 38° C.

EXAMPLE IX

A coating of elemental sulfur and a topcoating of sealant were added to minus 6- plus 12-mesh urea granules in much the same manner and in the same equipment as that described in Example I. The molten sulfur was held at an average temperature of 142° C., the atomizing air at 155° C., and the tumbling bed of granules at about 67° C. The sulfur content of the granules was 20.1 percent by weight. Following this, a petroleum softwax containing 25 percent oil and melting at 76° C. was sprinkled over the warm, tumbling sulfur-coated granules in an amount such that the sealant content of the product was 4 percent by weight. The sealant spread rapidly and completely. In the water-immersion test at 38° C. for 24 hours, only 2 percent of the urea granules was dissolved.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. A process of manufacturing fertilizer adapted for use in promoting survival and health in crop plants and containing specifically proportioned amounts of plant nutrients encased in a nearly impervious shell whereby the dissolution rate of said plant nutrients in soil solution is controlled, thereby ensuring the availability of plant nutrients to the crop plants during a substantial proportion of the growing season, which process comprises applying to fertilizer pellets, a subcoating of a material characterized by its oily nature, said material selected from the group consisting of petrolatums, petroleum softwaxes, petroleum oils, wood rosins, paraffins, and mixtures thereof, in quantities relative to the weight of said fertilizer particles in the range from about 1 percent to about 8 percent by weight, said quantities sufficient to fill the surface voids, cracks, and capillaries of said fertilizer particles; and subsequently applying to the resulting oil-coated, sized fertilizer particles a coating of elemental sulfur, the quantity of said elemental sulfur being in the range from about 5 percent to about 50 percent by weight of the finally coated fertilizer particle.

2. The process of claim 1 in which the sulfur-coated fertilizer particle is subsequently topcoated with additional amounts of said subcoating materials in quantities in the range from about 1 percent to about 5 percent by weight, and said quantities sufficient only to impregnate any cracks and voids in the said sulfur coating.

3. A process of manufacturing fertilizer adapted for use in promoting survival and health in crop plants and containing specifically proportioned amounts of plant nutrients encased in a nearly impervious shell, whereby the dissolution rate of said plant nutrients in soil solution is controlled, thereby ensuring the availability of plant nutrients to the crop plants during a substantial proportion of the growing season, which process comprises applying a coating of elemental sulfur to fertilizer pellets in quantity such that said sulfur contributes in the range from about 5 percent to about 50 percent by weight of the total coated fertilizer particle; subsequently topcoating the resulting coated particles with a sealant material characterized by its oily nature, said material selected from the group consisting of petrolatums, petroleum softwaxes, petroleum oils, wood rosins, paraffins, and mixtures thereof, in quantities such that said oily mixture contributes in the range from about 1 percent to about 8 percent by weight of the total weight of the coated fertilizer particle, and said quantity of oily material sufficient only to impregnate any cracks and voids in said sulfur coating.

4. The process of claim 3 in which the sulfur is heated to about 120° C. to 155° C. to maintain it at an optimum viscosity during application.

5. The process of claim 3 in which halogens, the nonmetallic elements, selected from the seventh group of the periodic system and consisting of fluorine, chlorine, bromine, iodine, and mixtures thereof, are added in amounts in the range from about 1 percent to about 5 percent by weight to molten sulfur prior to application of said sulfur onto said fertilizer particles, thereby decreasing the viscosity of said molten sulfur and enhancing the spraying and spreading characteristics of said molten sulfur.

6. The process of claim 3 in which powdered siliceous materials selected from the group consisting of powdered talc, powdered vermiculite, and mixtures thereof, are added in the range from about 1 percent to about 10 percent by weight to molten sulfur prior to application of said sulfur onto the fertilizer particles, thereby enhancing the plasticity and strength characteristics of the sulfur coating.

7. The process of claim 3 in which powdered compounds of the micronutrient elements iron, zinc, copper, manganese, magnesium, molybdenum, and boron are added in the range of 1 to 30 percent by weight to molten sulfur prior to application of said sulfur onto the fertilizer pellets, thereby providing uniformly distributed micronutrients as well as strengthening the coating.

References Cited by the Examiner

UNITED STATES PATENTS

| | | | |
|---|---|---|---|
| 2,161,035 | 6/1939 | Gilbert | 71—40 |
| 2,399,987 | 5/1946 | Cordie | 71—64 |
| 2,806,773 | 9/1957 | Pole | 71—64 |
| 3,192,031 | 6/1965 | Zaayenga | 71—28 |
| 3,206,297 | 9/1965 | O'Connor | 71—64 |
| 3,223,518 | 12/1965 | Hansen | 23—103 |

FOREIGN PATENTS 350,574  6/1931  Great Britain.

OTHER REFERENCES

Collings, G.H.: Commercial Fertilizers, McGraw-Hill Book Co., Inc., New York, 1955, 5th ed., p. 300.

Mellor, J. W.: Comprehensive Treatise on Inorganic and Theoretical Chemistry, N.Y., Longmans, Green and Company, vol. 10, 1930, p. 634.

DONALL H. SYLVESTER, *Primary Examiner.*

S. LEON BASHORE, T. D. KILEY,
*Assistant Examiners.*